(12) United States Patent
Silver

(10) Patent No.: US 6,695,551 B2
(45) Date of Patent: Feb. 24, 2004

(54) ROTATABLE TOOL HAVING A REPLACEABLE CUTTING TIP SECURED BY A DOVETAIL COUPLING

(75) Inventor: Bengt Silver, Hägersten (SE)

(73) Assignee: Sandvik AB, Sandviken (SE)

(*) Notice: Subject to any disclaimer, the term of this patent is extended or adjusted under 35 U.S.C. 154(b) by 11 days.

(21) Appl. No.: 09/983,522

(22) Filed: Oct. 24, 2001

(65) Prior Publication Data

US 2002/0057951 A1 May 16, 2002

(30) Foreign Application Priority Data

Oct. 24, 2000 (SE) .............................. 0003838

(51) Int. Cl.⁷ .............................. B23B 51/02
(52) U.S. Cl. .................. 408/1 R; 408/144; 408/230; 408/231; 408/713
(58) Field of Search ................ 408/1 R, 144, 408/59, 230, 226, 231, 232, 233, 713

(56) References Cited

U.S. PATENT DOCUMENTS

| | | | | |
|---|---|---|---|---|
| 2,640,378 A | * | 6/1953 | Haggar | 408/57 |
| 3,377,685 A | * | 4/1968 | Carlstedt | 403/14 |
| 5,769,577 A | | 6/1998 | Boddy | |
| 5,904,455 A | | 5/1999 | Krenzer et al. | |
| 5,957,631 A | | 9/1999 | Hecht | |

FOREIGN PATENT DOCUMENTS

| | | |
|---|---|---|
| DE | 367 010 | 1/1923 |
| DE | 3230688 | 2/1984 |
| JP | 001-113406 | 4/2001 |
| JP | 001-436796 | 6/2001 |

* cited by examiner

Primary Examiner—Daniel W. Howell
(74) Attorney, Agent, or Firm—Burns, Doane, Swecker & Mathis, LLP

(57) ABSTRACT

A rotatable cutting tool includes a rotatable tool body and a replaceable cutting tip for chip removing machining. The tool body includes a forward free end having a first dovetail coupling part formed thereon. The cutting tip includes a front cutting end and a rear mounting end. The mounting end includes a second dovetail coupling part joined to the first dovetail coupling part. An actuator, such as a screw, is provided which is arranged for elastically deforming one of the dovetail coupling parts to create a tightly clamped relationship between the first and second dovetail coupling parts. Insertion of a replacement cutting tip is performed by laterally mating the dovetail coupling parts until one of the coupling parts abuts a laterally facing stop surface of the other coupling part.

17 Claims, 4 Drawing Sheets

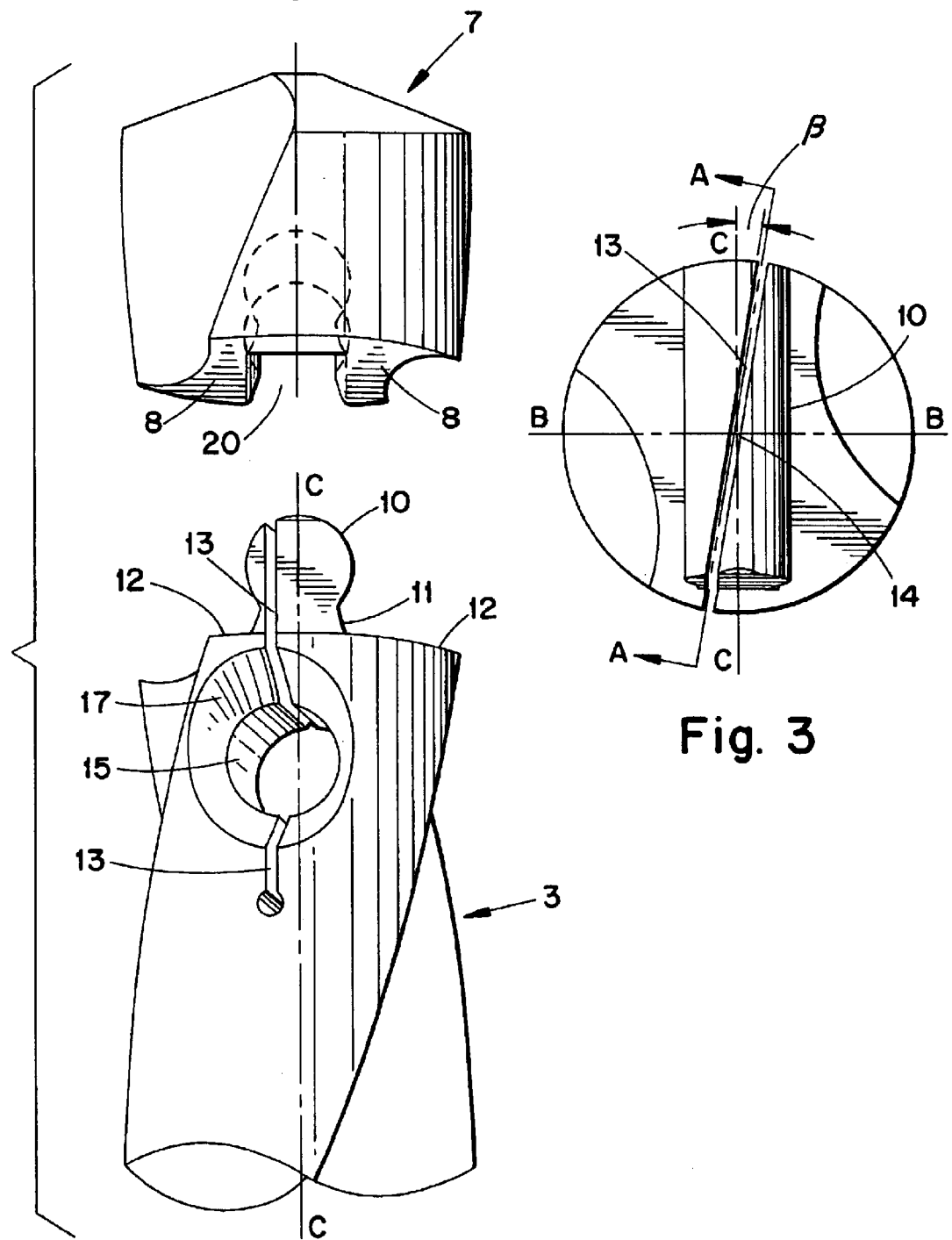

ROTATABLE TOOL HAVING A REPLACEABLE CUTTING TIP SECURED BY A DOVETAIL COUPLING

This application claims priority under 35 U.S.C. §§119 and/or 365 to Patent Application No. 0003838-0 filed in Sweden on Oct. 24, 2000, the entire content of which is hereby incorporated by reference.

BACKGROUND OF THE INVENTION

The present invention relates to a rotatable tool having a tool body and a replaceable cutting part at the chip removing free end of the tool body. The tool part has helicoidal or straight chip channels, and the cutting part has a cutting edge for chip removing machining. The tool part and the cutting part are interconnected by means of a dovetail coupling which comprises a male part and a female part. The invention also relates to the cutting part per se and to a method of replacing a cutting part. The tool can especially be a drill or a milling cutter.

PRIOR ART

A twist drill having a replaceable cutting part is previously known from German Document PS-367 010, the cutting part being connected to one of the ends of a drill shank by means of a dovetail coupling. The connection between the cutting part and the shank is entirely based on frictional forces between cooperating surfaces of said parts, and therefore there should be an obvious risk that the cutting part may be dislodged from the correct position thereof during handling of the drill.

A drill having a replaceable cutting part is previously known from U.S. Pat. No. 5,904,455. The cutting part is fixed in a recess in the front end of the drill by a clamping action of the sides of the recess abutting against the cutting part. This clamping action may be provided by inherent elasticity of the material forming the recess (or alternatively the clamping action may be enhanced by applying an axial force to the cutting part), by a suitable design of the bottom of the recess and the portion of the cutting part abutting thereagainst, a compressing force being generated on the cutting insert by the sides of the recess.

Aims and Features of the Invention

A primary aim of the present invention is to provide a tool of the kind defined above where the fixation of the replaceable cutting part takes place in an exceptionally simple but yet reliable manner.

Yet another aim of the present invention is that the cutting part, i.e. the article which is consumed, should be designwise exceptionally simple.

An additional aim of the present invention is that when assembling the cutting part on the tool part, it should in practice be impossible to assemble the cutting part in the wrong way and that the cutting part in principle automatically takes up a correct position in relation to the tool part.

At least the primary aim of the present invention is realized by a tool which comprises a rotatable tool body and a replaceable cutting tip for chip removing machining. The tool body defines a longitudinal axis of rotation and includes a forward free end which has a first dovetail coupling part formed thereon. The cutting tip includes a front cutting end and a rear mounting end. The mounting end includes a second dovetail coupling part joined to the first dovetail coupling part in tightly clamped relationship therewith. The cutting tip is removable from the tool body by sliding the second dovetail clamping part out of engagement with the first dovetail clamping part in a direction laterally of the axis of rotation. One of the dovetail coupling parts includes a laterally facing stop surface against which the other dovetail coupling part abuts, to limit the extent of insertion of the cutting tip onto the tool body.

The invention also pertains to a cutting tip for chip removing machining. The tip is formed of a hard material (such as ceramics or cemented carbide for example) and defines a longitudinal axis of rotation. The tip includes a front cutting end and a rear mounting end. The rear mounting end includes a female dovetail coupling part formed thereon which extends laterally of the axis.

The invention also pertains to a method of replacing a spent cutting tip with an identical replacement cutting tip. The method includes the steps of:

A) sliding the spent cutting tip out of the first dovetail coupling part in a direction laterally of the axis; and B) sliding the second dovetail coupling part of the replacement cutting tip into engagement with the first dovetail cutting part in a direction laterally of the axis until laterally facing surfaces of the first and second dovetail coupling parts abut one another.

BRIEF DESCRIPTION OF THE DRAWINGS

The objects and advantages of the invention will become apparent from the following detailed description of preferred embodiments thereof in connection with the accompanying drawing in which like numerals designate like elements, and in which:

FIG. 2 shows on a larger scale an exploded said view of a front part of the drill according to the present invention positioned closest to the tip, the cutting part being separated from the rest of the drill.

FIG. 3 shows a planar view (end view) of the tool part included in the drill according to the present invention.

DETAILED DESCRIPTION OF THE PREFERRED EMBODIMENTS OF THE INVENTION

Figure 1:
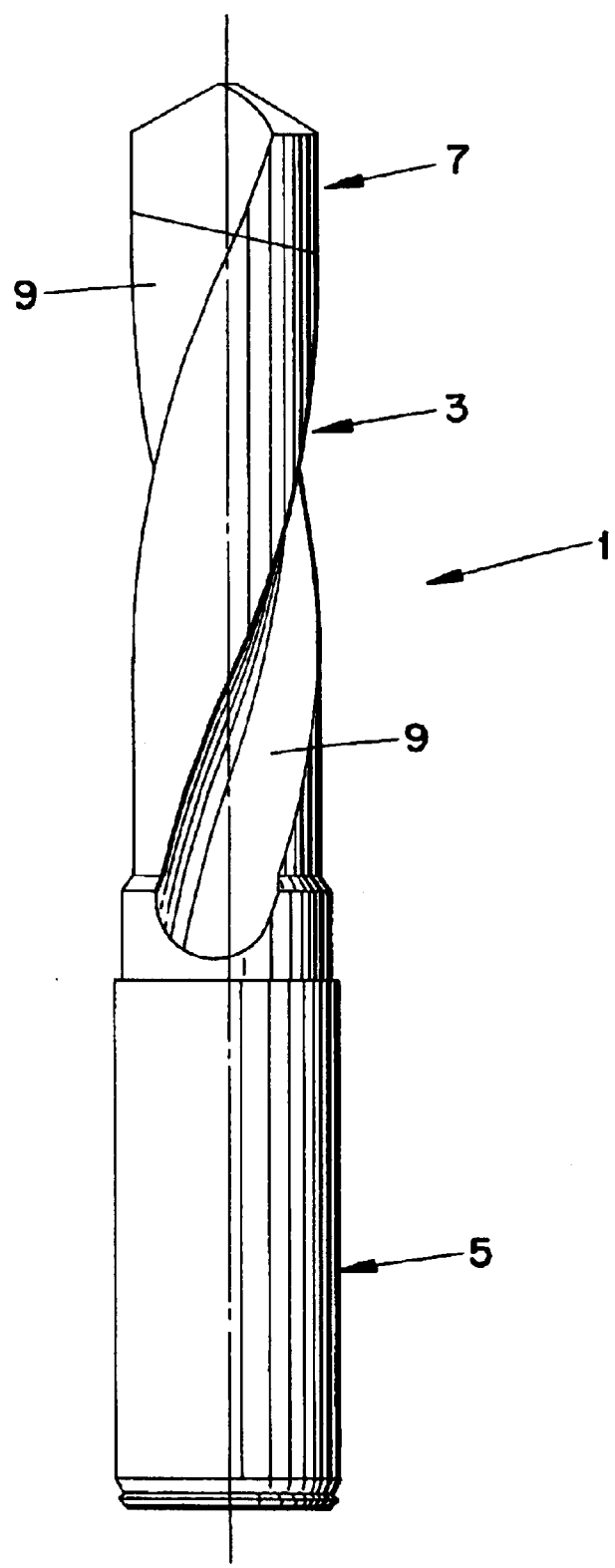
FIG. 1 shows a side view of a first embodiment of a drill according to the present invention.

The drill 1 illustrated in FIG. I comprises a body formed by a tool part 3 and a shank 5, which is intended to be received in a machine tool. The drill 1 also comprises a replaceable cutting part or tip 7 which is attached to the front end of the tool part 3 facing away from the shank. The cutting part 7 includes a front cutting end and a rear mounting end. The cutting end is provided with a cutting insert or an integral cutting edge for chip removing machining. Helicoidal chip channels 9 are formed on the circumference of the tool part 3. Said chip channels 9 also extend into the circumference of the replaceable cutting part 7.

As is most clearly seen in FIG. 2, the cutting part 7 is connected to the tool part 3 by means of a dovetail coupling. In the embodiment illustrated in FIGS. 1–5, the dovetail coupling comprises a male dovetail coupling part 10, which constitutes an integrated part of the tool part 3. The male part 10 constitutes a projection having an extension in the longitudinal direction thereof, the extension occupying a major part of the diameter of the tool part 3, see FIG. 4. However, the left end in FIG. 4 of the male part 10 is displaced a distance from the periphery of the tool part 3. The significance of this design will be explained below in connection with the description of the function of the dovetail coupling. In a side view, see FIG. 2, the male part 10 has a generally circular shape with a connection portion 11 connecting to the tool part 3, which portion 11 has a smaller transverse dimension than the maximum transverse dimension of the cross-section. The male part 10 has, in the main, constant external dimensions along the entire longitudinal direction thereof. A first support surface 12 surrounds three sides of the male part 10. The first support surface 12 is planar and non-parallel relative to the longitudinal direction of the tool. Rather, when viewing the tool in a direction perpendicular to the axis of rotation, it can be seen that the surface 12 forms an obtuse angle a with a first, axially extending, center plane B—B of the tool part 3 and the cutting part 7, which center plane B—B extends perpendicularly to the paper in both FIGS. 3 and 4. Preferably, the angle a is of the order of 1000. A suitable range for the angle a is: 09°<α<120°. A longitudinal center axis 14 of the male part 10 forms the corresponding angle a to the center plane B—B.

As is seen in FIGS. 2 and 3, a slot 13 is formed in the tool part 3 and the male part 10. The slot 13 is situated in a plane, which has an extension in the axial direction of the tool part 3. As for the extension of the slot 13 in the radial direction of the tool part 3, this is seen in FIG. 3. Thus, the slot 13 passes through the axis of rotation 14 of the drill 1. When the tool part 3 is viewed along the axis of rotation, the slot 13 forms an acute angle β with a second, axially extending, center plane C—C of the male part 10, which second center plane C—C is perpendicular to the first center plane B—B, see FIG. 3. This means that the slot 13 breaks through the ends of the male part 10 at a distance from the center plane C—C, see both FIGS. 2 and 3. This is advantageous from the point of view strength, which will be explained in more detail in connection with FIG. 5.

Figure 4:
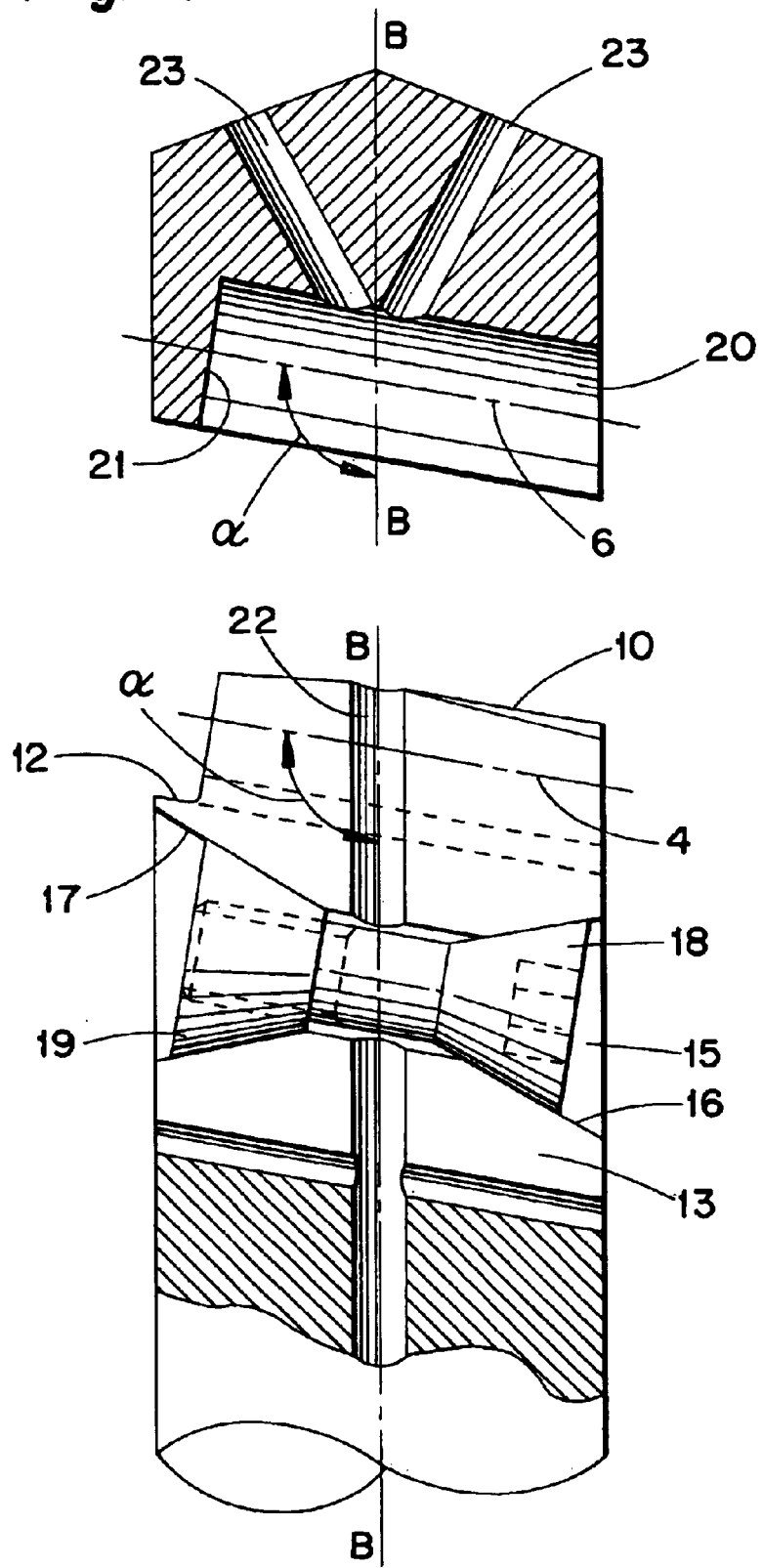
FIG. 4 shows a section along line A—A in FIG. 3 through the tool part as well as a corresponding cross-section through the cutting part.

The tool part 3 also comprises a through-hole 15, which is spaced from the male part 10 and is inclined so as to extend parallel to the male part 10 and the first support surface 12 (See FIG. 4). Furthermore, the hole 15 extends parallel to the slot 13, as seen in a planar view of the tool part 3, i.e., according to FIG. 3. Thus, the longitudinal center axis of the hole 15 forms an angle β with the second center plane C—C (see FIG. 3), although the hole 15 is not shown in this figure. In FIG. 4 is seen that the slot 13 extends axially rearwardly for a distance from the hole 15. The lower limiting edge of the slot 23 has the same pitch (inclination) in relation to the first center plane B—B as the hole 15, the male part 10 and the first support surface 12.

As is most clearly seen in FIG. 4, the hole 15 is, in the area of the ends thereof, formed with a first conical portion 16 and a second conical portion 17. In the hole 15, an actuator comprising a screw 18 is attached. The screw 18 has a conical head as well as an unsymmetrical, conical nut 19 cooperating with the screw 18. The screw 18 cooperates with the first conical portion 16 while the nut 19 cooperates with the second conical portion 17. The second conical portion 17 associated with the nut 19 is formed in such a way that when contact occurs with the unsymmetrical nut 19, the latter is prevented from rotating.

Thus, the conical portions 16 and 17 are intended to constitute surfaces for the screw 18 and the nut 19 to act against when the screw and nut are in engagement with each other and approach each other during tightening of said screw connection. This means that on tightening of said screw connection, the slot 13 will be widened, the significance of which will be described in more detail below in connection with the description of the function of the dovetail coupling.

As is most clearly seen in FIGS. 2 and 4, the cutting part 7 is provided with a female dovetail coupling part 20 which in principle consists of an elongated groove having a shape corresponding to the male part 10, i.e. the groove has a generally circular cross-section. Preferably, the female part 20 is formed as a groove that has constant internal dimensions along the entire longitudinal direction thereof, which longitudinal direction extends laterally of the axis 14 (see FIG. 4) As is seen in FIG. 4, the female part 20 does not extend along the entire lateral dimension of the cutting part 7; rather the left end of the female part 20 (in FIG. 4) is defined by a laterally facing stop face 21, which has the purpose of cooperating with the left end in FIG. 4 of the male part 10.

As in the case of the male part 10, a longitudinal center axis 6 of the female part 20 is not perpendicular to the longitudinal direction of the tool, but rather forms an obtuse angle a to the first center plane B—B, see FIG. 4. A second support surface 8 of the cutting part 7 surrounds three sides of the female part 20. The surface 8, which in the embodiment illustrated, is plane, it forms a corresponding angle a to the first center plane B—B.

In both the tool part 3 and the cutting part 7, cooling ducts are provided, the tool part 3 having an axially extending first cooling duct 22 situated in the center of the tool part 3. The cutting part 7 has two second cooling ducts 23 diverging from the center of the cutting part 7, which ducts port in the free end of the cutting part 7.

To achieve interconnection of the cutting part 7 with the tool part 3, the cutting part 7 is pushed onto the tool part 3 from the left in FIG. 4, i.e., the female part/groove 20 is pushed onto the male part 10 in a direction laterally of the axis of rotation until the left end in FIG. 4 of the male part 10 comes into abutment against the stop face 21 of the female part 20. Thanks to the inclination of: the male part 10, the female part 20, and the first and second support surfaces 12 and 8, it will be appreciated that the stop face 21 of said cutting part 7 will be pressed against the left end of the male part 10 in FIG. 4, as a result of the load which is applied to the cutting part 7 during a machining operation employing the tool according to the present invention. This design contributes, to a large extent, to the cutting part 7 taking up a correct position on the tool part 3. When the cutting part 7 has assumed the above described position on the tool part 3, the dovetail coupling is activated. To do so, the screw 18 is manipulated by being rotated in relation to the nut 19, which is prevented from rotating. This means that the screw 18 and the nut 19 approach each other, which in turn ensures that the slot 13 is widened (i.e., portions of the male part 10 disposed on opposite sides of the slot 13 are displaced away from one another), and a tight clamping of the cutting part 7 in relation to tool part 3 thus takes place.

Figure 5:
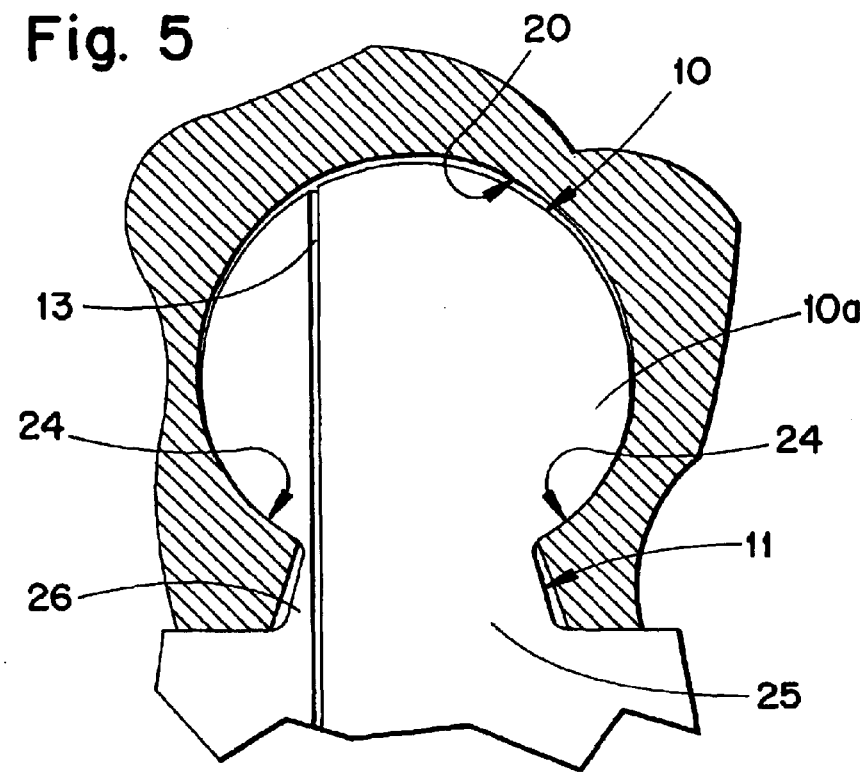
FIG. 5 shows in detail cooperating surfaces of the male part and the female part in the dovetail coupling.

In order to illustrate closer how this clamping takes place, reference is made to FIG. 5. In the areas in FIG. 5 designated 24, a contact between the male part 10 and the female part 20 takes place when the slot 13 is widened. The forces generated in these areas 24 are directed obliquely downwards and diverge from each other. This means that the second support surface 8 of the cutting part 7 will be pressed against the first support surface 12 of the tool part 3, which is advantageous in order for the cutting part 7 to retain the correct position on the tool part 3, since the tool according to the present invention during use is occasionally exposed to large stresses.

It will be appreciated that the areas 24 constitute undercut regions which lie axially behind a portion 10a of the male dovetail part 10. That is the arrangement that forms a dovetail and prevents the cutting part 7 from moving axially forwardly relative to the tool part 3, i.e., the portion 10a creates an axial obstruction. It will be appreciated that the expression "dovetail" as used herein includes interface areas 24 that are curved. Of course, such areas could be planar instead of curved, if desired.

During use of the tool, i.e. rotation of the same, the connecting portion 11 will also be exposed to stresses. The connection portion 11 represents a critical section, since this portion 11 has the smallest transverse dimension in the dovetail coupling.

In order to accommodate the forces acting on the connection portion 11 in the best possible way, the slot 13 has been given an extension such that the slot, as has been pointed out above, breaks through the ends of the male part 10 at one side the center portion of the male part 10. Thereby, as shown in FIG. 5, a relatively large undivided first section 25 of the connection portion 11 is formed in each of the two ends of the connection portion 11, said first section 25 being oriented in such a way that it takes up the forces generated from the rotation. Beside the first section 25, a second section 26 is formed, which is substantially smaller than the first section 25.

In this connection, it should be pointed out that, in the abovedescribed embodiment, the male part 10 applies clamping forces against the female part 20 only in the areas 24. This means that the male part 10 and the female part 20 need to have a shape corresponding to each other only in the areas 24. In other respects the shape of said parts may vary in a variety of different ways as long as the cross-section of the male part 10 is situated within the cross-section of the female part 20.

To replace a spent cutting part 7, the screw 18 is loosened thereby relieving the clamping relationship between the tool part 3 and the cutting part 7. That enables the spent cutting part to be slid laterally from the tool part. Then, a replacement cutting part is installed in the manner described earlier.

Figure 6:
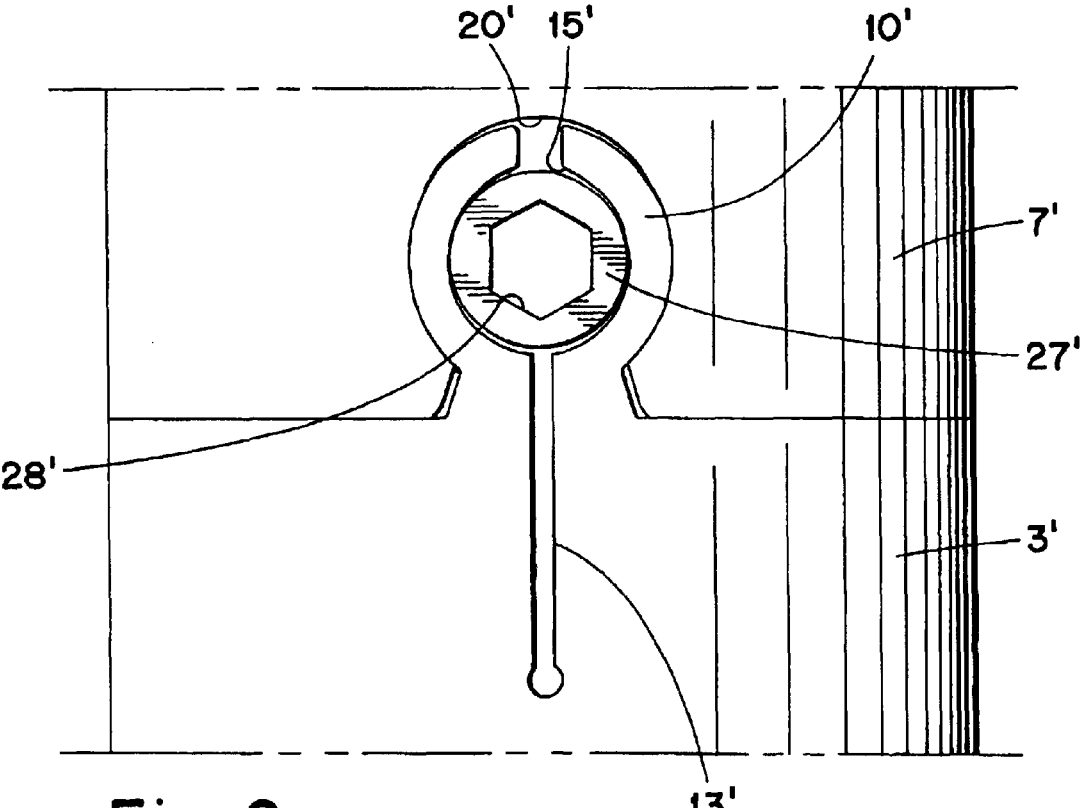
FIG. 6 shows schematically an alternative embodiment of a dovetail coupling.

In FIG. 6, an alternative embodiment of the dovetail coupling between a tool part 3' and a cutting part 71 is schematically shown. The male part 10' has a generally circular cross-section and comprises a connection portion 11' having a smaller transverse dimension than the largest transverse dimension of the male part 10'. The male part 10' has a through-hole 15' extending along the longitudinal direction thereof, which has a circular cross-section and is centrally situated in the male part 10'. In the hole 15', an out of round pin 27' is received, which is rotatable in the hole 15' but fixed in the axial direction of the male part 10'. The pin 27' is provided with a key recess 28' for rotation of the pin 27'. A slot 13' is centrally situated and extends a distance into the tool part 3'. The female part 20' has a principally similar design as the female part 20. Even if it is not seen in FIG. 6, the male part 10' and the female part 20' may have the same pitch (inclination), in relation to the longitudinal direction of the tool, as the male part 10 and the female part 20. The female part 20' may also, at one end thereof, be provided with a stop face in the corresponding way as the female part 20 has a stop face 21.

The dovetail coupling according to FIG. 6 works in such a way that at mounting of the female part 20' on the male part 10', which is carried out by the female part 20' being pushed onto the male part 10', the pin 27' is oriented in such a way that the smallest transverse dimension thereof extends horizontally in FIG. 6. When the female part 20' is pushed onto the male part 10', the pin 27' is rotated so that the largest transverse dimension thereof assumes a horizontal position, which is shown in FIG. 6. In doing so, the slot 13' will be widened and clamping of the female part 20' on the male part 10' takes place in principally the same way as in the embodiment according to FIGS. 1–5.

A general principle for the tool according to the present invention is that the cutting part 7; 7' is manufactured from cemented carbide, ceramics or another comparatively hard material. This has the advantage that the chips do not wear material from the cutting part 7; 7' to the same extent as if a part of the cutting part 7; 7' were manufactured in steel. The tool part 3; 3' is manufactured from a comparatively softer material, preferably steel.

The tool according to the present invention is preferably intended for chip removing machining in metal, but it is fully possible to use the tool also for other materials in which the tool can function.

Feasible Modifications of the Invention

In the two above-described embodiments, the male part 10;10' is situated on the tool part 3; 3' and the female part 20; 20' is formed in the cutting part 7; 7'. Clamping of the female part 20; 20' on the male part 10; 10' is provided by causing the male part 10; 10' to expand. Within the scope of the present invention, it is, however, conceivable that the male part could be situated on the cutting part and the female part formed in the tool part. In doing so, a slot would be arranged in the tool part adjacent to the female part. Clamping of the male part in the female part would take place by the female part being compressed and squeezed against the male part, in which this clamping may, for instance, take place by a through-screw connection in the tool part adjacent to the slot.

In the embodiment according to FIGS. 1–5, the expanding member (actuator) consists of a screw connection 18, 19 while in the embodiment according to FIG. 6 the expanding member (actuator) consists of a pin 27' with an out of round cross-section. However, within the scope of the present invention, it is conceivable that the pin 27' with the out of round crosssection could be used in the embodiment according to FIGS. 1–5 and that the screw connection 16, 19 could be used in the embodiment according to FIG. 6. It is also possible to use other types of expanding members within the scope of the present invention.

Above, it has been stated that the cutting part 7; 7' should be manufactured of a hard material, the cutting part 7; 7' preferably being solid and formed of the material in question. However, within the scope of the present invention, it is feasible that the cutting part could be manufactured from a compound material, i.e. that the surface layer consists of a hard material while the core consists of a softer material.

In FIG. 1 is seen that the tool part 3 and the cutting part 7 are provided with helicoidal chip channels 9. Within the scope of the invention, it is, however, conceivable that the chip channels could be straight and extend in the axial direction of the tool.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A rotatable tool comprising a rotatable tool body and a replaceable cutting tip for chip removing machining, the tool body defining a longitudinal axis of rotation and including a forward free end having a first dovetail coupling part formed therein, the cutting tip including a front cutting end and a rear mounting end, the mounting end including a second dovetail coupling part joined to the first dovetail coupling part in tightly clamped relationship, the cutting tip being removable from the tool body by sliding the second dovetail clamping part out of engagement with the first dovetail clamping part in a direction laterally of the axis of rotation, wherein one of the dovetail coupling parts includes a laterally facing stop surface against which the other dovetail coupling part abuts, to limit the extent of insertion of the cutting tip onto the tool body.

2. The tool according to claim 1 wherein the first dovetail coupling part comprises a male part, and the second dovetail coupling part comprises a female part in which the male part is disposed, the male part including a slot extending along the entire male part in a direction laterally of the axis.

3. The tool according to claim 2 wherein the slot forms an acute angle with an axial center plane of the male part as the male part is viewed in a direction along the axis.

4. The tool according to claim 2, further including a manual actuator arranged for expanding the male dovetail part by displacing portions thereof on opposite sides of the slot away from one another, wherein the tool body includes a through-hole extending therethrough in a direction laterally of the axis, the actuator situated in the through-hole.

5. The tool according to claim 4 wherein the through-hole includes a generally conical portion of each of its ends, the actuator comprising a screw having a generally conical head disposed in one of the generally conical portions, the actuator further comprising a generally conical nut attached to the screw and situated in the other generally conical portion, the through-hole passing through the slot wherein the head engages two portions of the male part situated on opposite sides of the slot, and the nut also engages both of those portions of the male part.

6. The tool according to claim 4 wherein the through-hole is spaced from the male part.

7. The tool according to claim 4 wherein the through-hole extends through the male part.

8. The tool according to claim 1 wherein each of the first and second dovetail coupling parts includes a center line extending generally laterally of the axis, each of the center lines forming an obtuse angle with an axial center plane of the tool body when the tool body is viewed in a direction perpendicular to the axis.

9. The tool according to claim 8 wherein the obtuse angle is no greater than about 120°.

10. The tool according to claim 1 wherein the first dovetail coupling part comprises a male part, and the second dovetail coupling part comprises a female part, the stop surface being formed in the female part.

11. A rotatable tool comprising a rotatable tool body and a replaceable cutting tip for chip removing machining, the tool body defining a longitudinal axis of rotation and including a forward free end having a first dovetail coupling part formed therein, the cutting tip including a front cutting end and a rear mounting end, the mounting end including a second dovetail coupling part joined to the first dovetail coupling part, a manual actuator arranged for releasably holding the first and second dovetail clamping parts in tightly clamped relationship with one another, the cutting tip being removable from the tool body by sliding the second dovetail clamping part out of engagement with the first dovetail clamping part in a direction laterally of the axis of rotation, upon release of the actuator.

12. A cutting tip for chip removing machining formed of a cemented carbide material, the tip defining a longitudinal axis of rotation and including a front cutting end and a rear mounting end, the rear mounting end including a female dovetail coupling part formed therein, the female dovetail coupling part extending laterally of the axis.

13. A cutting tip for chip removing machining formed of a hard material, the tip defining a longitudinal axis of rotation and including a front cutting end and a rear mounting end, the rear mounting end including a female dovetail coupling part formed therein, the female dovetail coupling part extending laterally of the axis wherein the female dovetail coupling part includes an open end and a closed end, the closed end defined by a laterally facing stop surface.

14. The cutting tip according to claim 13 wherein a centerline of the female dovetail coupling part forms an obtuse angle with an axial center plane of the cutting tip.

15. The cutting tip according to claim 14 wherein the obtuse angle does not exceed about 120°.

16. A method of replacing a spent cutting tip of a rotatable tool with an identical replacement cutting tip, the tool comprising a tool body defining a longitudinal axis of rotation and having a forward free end which includes a first dovetail coupling part, the spent cutting tip including a front cutting end and a rear attachment end including a second dovetail coupling part joined to the first dovetail coupling part in tightly clamped relationship with one another; one of the first and second dovetail coupling parts comprising a dovetail groove defining a longitudinal axis, and the other of the first and second dovetail coupling parts comprising a dovetail projection slidable within the groove; the method comprising the steps of:

A) sliding the spent cutting tip out of the first dovetail coupling part in a direction laterally of the axis; and B) sliding the second dovetail coupling part of the replacement cutting tip into engagement with the first dovetail coupling part in first direction laterally of the axis until laterally facing stop surfaces, formed by the dovetail projection and the dovetail groove, respectively, and intersected by the axis, abut one another in a manner preventing further movement of the cutting tip in the first direction.

17. The method according to claim 16 wherein the tool further comprises a manual actuator arranged for holding those first and second dovetail coupling parts in tightly clamped relationship with one another; the method further comprising:

prior to step A, the step of manipulating the actuator for loosening the tightly clamped relationship between the first dovetail coupling part and the second dovetail coupling part of the spent cutting tip; and subsequent to step B, the step of manipulating the actuator for producing a tightly clamped relationship between the first dovetail coupling part and second dovetail coupling part of the replacement cutting tip.

* * * * *